Figure 1:
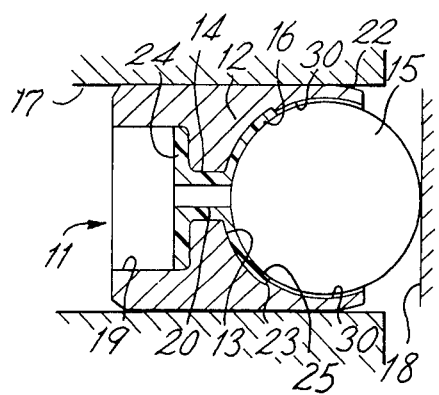

United States Patent [19]

Cunningham

[11] 4,043,255
[45] Aug. 23, 1977

[54] CAM FOLLOWER PISTON

[75] Inventor: Sinclair Upton Cunningham, East Kilbride, Glasgow, Scotland

[73] Assignee: National Research Development Corporation, London, England

[21] Appl. No.: 597,984

[22] Filed: July 22, 1975

Related U.S. Application Data

[60] Continuation-in-part of Ser. No. 358,543, May 9, 1973, abandoned, which is a division of Ser. No. 177,266, Sept. 2, 1971, Pat. No. 3,783,748.

[30] Foreign Application Priority Data

Sept. 2, 1970 United Kingdom ............... 42010/70

[51] Int. Cl.² .............................. F16J 1/08; F16J 1/10
[52] U.S. Cl. ........................................ 92/158; 91/488;
92/181 P; 92/248
[58] Field of Search ................. 92/172, 248, 249, 181,
92/158; 91/488, 491; 403/122, 133, 135, 140

[56] References Cited

U.S. PATENT DOCUMENTS

| 2,712,794 | 7/1955 | Humphreys | 91/485 |
| 2,954,992 | 10/1960 | Baker | 264/278 X |
| 3,125,004 | 3/1964 | White | 92/249 X |
| 3,186,352 | 6/1965 | Anderson | 91/488 X |

FOREIGN PATENT DOCUMENTS

| 582,522 | 9/1959 | Canada | 91/488 |
| 948,923 | 6/1974 | Canada | |
| 1,254,200 | 1/1961 | France | 91/498 |
| 1,947,585 | 6/1970 | Germany | 91/491 |
| 1,342,905 | 1/1974 | United Kingdom | |

Primary Examiner—Irwin C. Cohen
Attorney, Agent, or Firm—Cushman, Darby & Cushman

[57] ABSTRACT

A piston for a hydrostatic machine comprises a cam follower ball in a seating in a piston body. An aperture through the piston body provides access for working fluid to reach the seating to give lubrication and hydrostatic support. A low friction insert of synthetic plastics material in the seating provides a bearing surface for the ball. The insert is retained in the piston body by a lip which prevents or inhibits extrusion of the plastics material under working load pressure.

1 Claim, 4 Drawing Figures

CAM FOLLOWER PISTON

This application is a continuation-in-part of Ser. No. 358,543 filed May 9, 1973 now abandoned, which is a division of Ser. No. 177,266, U.S. Pat. No. 3,783,748, issued Jan. 8, 1975 and filed Sept. 2, 1971.

The present invention relates to a piston for use in hydrostatic pumps or motors of rotary or linear types.

A hydrostatic machine is one in which the mechanical output (in the case of a motor) or the mechanical input (in the case of a pump) is a function of the pressure (and thus potential energy) of the working fluid rather than its velocity (and kinetic energy).

In a conventional ball piston hydrostatic machine, each piston comprises a ball which is a close sliding fit in a cylinder bore to which the working fluid, such as oil, is admitted and from which it is exhausted. The balls operate as cam followers, engaging a cam track which moves relative to the cylinders in which the ball pistons reciprocate.

At low rates of reciprocation of the ball piston, oil leakage past the ball can rise to a significant proportion of the total amount fed to the cylinder. As the ball must be free to rotate within the cylinder to act as a cam follower, it is not possible to reduce the oil leakage by providing any form of pressure seal on the ball.

It has been proposed previously to provide an auxiliary piston to reduce the leakage past the ball, and this has taken the form of a substantially rigid disc having a sliding fit in the cylinder bore of the ball piston, and providing a seating for the ball. It has proved difficult in such an arrangement to reduce the friction between the disc and the ball.

In accordance with the present invention there is provided a piston comprising a piston body having a seating at one end, and an insert of low friction material which is shaped to provide in the seating a bearing for a cam follower.

The piston body has an aperture which extends from the seating to an end face of the piston body remote from the seating, the insert extending into the aperture. The said insert may have a flange extending over at least part of the said end face of the piston body. That part of the insert which extends through the said aperture has a passageway leading from the said end face of the piston body to the surface of the bearing in the seating, and allowing lubrication of the bearing in operation.

The said insert is of synthetic plastics material. Conveniently the said insert may be made of polytetrafluoroethylene, nylon, or an acetal material such as "Delrin" or "Kemetal."

Figure 2:
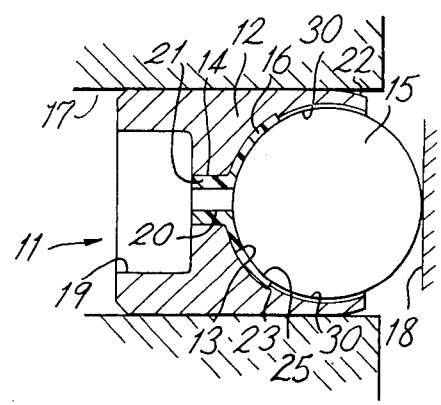
Figure 3:
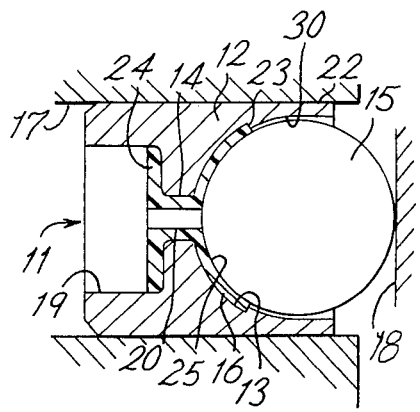
Figure 4:
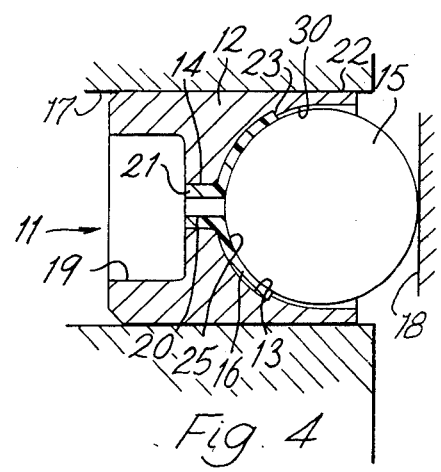

Embodiments of the invention will now be described by way of example with reference to the accompanying drawings in which:

FIG. 1 is an axial section of a ball piston for a hydrostatic machine, and embodies the present invention; and FIGS. 2, 3 and 4 are sections of modifications of the piston shown in FIG. 1.

In FIG. 1 there is shown a piston for a ball piston hydrostatic pump or motor. The piston 11 comprises a piston body 12 having a seating 13 at one end of the piston body, and an aperture 14 extending from the seating 13 axially of the piston body 12 to the other end thereof. The seating 13 is shaped to receive a ball cam follower 15, and the seating 13 is lined by an insert 16 which forms a bearing for the ball 15. In operation, the piston 11 reciprocates in a cylinder bore 17 under the action of a cam track 18 which is engaged by the ball 15. When used in a hydrostatic machine, the bore 17 is filled with a working fluid such as oil.

The insert 16 is of plastics material and is of substantially lesser friction relative to metal than the piston body 12, which is conveniently of metal, as is the ball 15. The insert 16 extends through the aperture 14. The insert 16 has a lubrication hole 20 along the axis of the body communicating between the seating 13 and the end face of the body remote from the seating.

In the arrangement shown in FIG. 1 the insert 16 is conveniently moulded in situ into the piston body 12, the mould being formed partly by the body 12 and partly by additional mould components to shape the seating 13 (and where necessary, the end face of the insert 16 remote from the seating). Preferably a low friction plastics material such as polytetrafluorethylene is used and is injection moulded.

In FIG. 1 the end of the piston body 12 surrounding the seating 13 is rolled over the ball to retain the ball 15.

An important feature of the present invention (as shown for example in FIG. 1) is that the piston body 12 has a lip 23 extending around the entire perimeter of the seating 13 and projecting inwardly towards the ball 15. The main function of the lip 23 in FIG. 1 is to prevent or inhibit extrusion of the synthetic plastics material of the insert 16 under the pressure of the bearing load of the ball 15. The lip 23 also serves to retain the insert 16 in the piston body 12 and to prevent the insert from coming loose from the piston body 12 during assembly and light running or free wheeling conditions. This latter function of preventing the insert 16 from coming loose from the piston body 12 is also facilitated by a flange 24 formed on the insert 16 in a recess 19 at the rear of the piston 11. In order to form the flange 24, the insert 16 is conveniently moulded in situ as has been explained. However, the flange 24 and the moulding of the insert 16 in situ are optional and are not essential in putting the invention into operation. FIG. 2 illustrates a modification of the piston of FIG. 1 in which the flange 24 of FIG. 1 is omitted, the rear of the insert 16 being arranged to terminate in a stem 21. In the piston of FIG. 2, the insert 16 is conveniently formed prior to assembly of the piston, and is inserted in position by locating the stem 21 in the aperture 14 and pushing the insert 16 home into the seating 13 so that the insert 16 snaps under the lip 23. The insert 16 is made of a suitably resilient synthetic plastics material.

In the pistons of FIGS. 1 and 2, a portion 22 of the piston body 12 extends beyond the centre plane of the ball 15, and is rolled over to retain the ball in the seating 13. FIGS. 3 and 4 show modifications of FIG. 1 in which the portion 22 extends beyond the centre plane of the ball 15 but is not rolled over. In some circumstances such an arrangement is advantageous in increasing the rigidity of the piston. In FIG. 3 the insert 16 is conveniently moulded in situ as in FIG. 1. In FIG. 4 the insert 16 is conveniently formed before assembly and is snapped under the lip 23 as has been explained with reference to FIG. 3.

There will now be described in more detail the advantageous features of the present invention with reference to the embodiments shown in FIGS. 1 to 4.

One of the advantages of the invention as shown in the embodiments illustrated is that the working fluid passing along the aperture 20 to the internal bearing surface of the insert 16 (indicated at 25) not only provides lubrication but also provides hydrostatic support for the ball 15. In operation the ball 15 is partly supported by the synthetic plastics insert 16 and partly by the hydrostatic support of the working fluid.

The bearing surface 25 is bowl-shaped and may for example be part spherical although other generally bowl-shaped configurations may be used. In practice, due to slight movements of the ball 15 during its rotation, and due to slight deformation of the insert under working conditions, there arises behind the ball 15 a pocket of working fluid which gives hydrostatic support.

The operation of the hydrostatic support for each of the embodiments described is as follows. Although the ball 15 has a close fit with the insert 16, there will be some slight clearance through which fluid leaks from the passageway 20 outwardly towards the cam surface 18. During rotation of the ball 15 against the cam surface 18, any slight movement of the ball 15 outwardly towards the cam surface 18 will result in an increase in the clearance between the ball 15 and the insert 16, so as to allow an easier leakage of liquid from the pocket of fluid at the back of the ball. Any movement of the ball 15 towards the insert 16 will restrict the clearance between the ball 15 and the insert 16 and so will reduce the leakage of fluid from the pocket towards the cam surface 18. This means that there is a variable clearance between the ball 15 and the insert 16 which in turn causes slight variations of the hydrostatic pressure in the pocket behind the ball 15. These pressure variations are in the correct sense to provide the effect of a spring supporting the ball 15. That is to say that if during normal operation the ball moves towards the seating 13, the pressure returning the ball to its proper position increases. If on the other hand the ball 15 moves away from the seating 13, the supporting hydrostatic pressure is reduced slightly due to increased leakage.

There has been described in each embodiment a lip 23 which retains the insert 16 in place in the piston body. The main function of the lip 23 however is to prevent extrusion of the synthetic plastics material of the insert under the high pressure and temperatures which prevail in operation. It is important that this lip is continuous and extends around the entire perimeter of the seating. By way of example, it has been found that a 1 7/16 inch piston supporting a 1¼ inch ball in a seating with a synthetic plastics insert but with no anti-extrusion lip was on the verge of extrusion at 3500 lb/in². In contrast, a similar piston having an anti-extrusion lip was still undeformed at 5500 lb/in² at the same temperature of 50° C and at a speed of 100 rev/min after 50 hours running. The depth of the lip will be different for different configurations of seating, but must always be selected to be of sufficient depth to prevent or inhibit extrusion of the material of the insert. The shape and position of the anti-extrusion lip 23 is preferably arranged to be such as to expose the minimum gap between the ball 15 and the inside piston wall in the region indicated at 30. When fluid pressure is applied to the back of the piston 12, the ball 15 which is in contact with the cam surface 18 is pressed into the synthetic plastics insert 16. If this pressure is sufficiently high it can overcome the flow resistance of the plastics material and squeeze it out of the gap between the ball 15 and the piston wall 30. The narrower this gap is, the higher is the pressure required to squeeze out the plastics material. The inside bore of the top 30 of the piston may be, for example, in the region of 0.010 inch bigger than the ball.

When in operation a high pressure load is placed on the ball 15 by the cam track 18, the lip 23 and the gap in the region 30 create a condition for the plastics material analogous to an extrusion orifice. Referring to the Figures, the factor known as the extrusion ratio is, in the embodiment shown, the ratio of (i) the distance between the surface of the ball 15 and the surface of the seating 13, to (ii) the distance between the surface of the ball 15 and the inside diameter of the retaining lip 23. The relationship between the pressure required to produce extrusion, and the extrusion ratio follows the general law $$P = \overline{Y} \log_e R$$

where $P$ is the extrusion pressure $\overline{Y}$ is a material constant related to the mechanical strength of the plastics material $R$ is the extrusion ratio It therefore follows that for a given thickness of plastics insert, the operating pressure which the piston can withstand is inversely dependent upon the size of the gap between the piston ball 15 and the inside of the piston body in the region 30 (because the extrusion ratio is proportional to the thickness of the insert divided by the extrusion gap). Thus the smaller the gap in the region 30, the higher pressure the piston can withstand. Hence to achieve the minimum gap for a desired thickness of plastic insert, there is provided in accordance with the present invention a continuous lip around the entire perimeter of the seating. This allows the necessary reduction in ball-to-piston gap whilst maintaining a required depth of plastics insert 16. One example of a suitable average thickness of the insert 16, for a ball size of about one inch diameter, is a thickness of about 0.04 inch, but an appropriate thickness will be different for different diameters of piston. The following are examples of dimensions which may be used for the geometry of the lip.

| Piston size | Gap | Extrusion ratio |
|---|---|---|
| ⅞ inch dia | .003 inch | 7.67 |
| 1¼ " dia | .005 " | 6.00 |
| 2⅜ " dia | .007 " | 5.29 |

It will be appreciated that the figures given above for the lip to ball gap are nominal figures, and operation tolerances will apply to these figures. For example, for a nominal gap of 0.003 inch the tolerance may be 0.0010 inch or even 0.0015 inch, so that the gap may vary between 0.0015 and 0.0045 inch. It will further be appreciated that the FIGS. 1 to 4 accompanying the specification are diagrammatic representations of sections of pistons and are not drawn to scale, the width of the gap 30 being exaggerated for illustrative purposes.

In the formula $$P = \overline{Y} \log_e R$$

the material constant $\overline{Y}$ is closely related to the ultimate tensile strength of the synthetic plastics material. In embodiments of the invention the material constant $\overline{Y}$ may for example be in the range 8,000 to 20,000 lb/sq.in.

The extrusion ratio may be simply expressed in embodiments of the present invention as the ratio of the mean thickness of the bowl-shaped portion of the plastics insert to the width of the gap between the ball and the inner perimeter of the lip around the seating. In arriving at a suitable value of this ratio for a particular embodiment of the invention a number of factors need to be taken into account both in selecting the insert thickness and the lip to ball gap.

When selecting the thickness of the insert, the insert is made as thin as possible consistent with obtaining a good moulding of the insert. The minimising of the insert thickness is desirable in order to minimise distortion during high loading of the ball, and in order to use less plastics material to minimise cost.

The lip to ball gap must be of sufficient width to avoid unwanted frictional contact between the ball and the piston body, but must be as small as possible in order to maximise the extrusion ratio. For example, if the gap between the ball and the piston body were to be equal to the thickness of the insert (i.e. no lip present) the extrusion pressure would be relatively low, i.e. substantially equal to the ultimate tensile strength of the plastics material. The advantage of the lip is that is raises the pressure required before extrusion begins.

By way of example, a generally preferred value of the extrusion ratio for embodiments of the present invention lies in the range 3 to 10, and a particularly preferred value of the extrusion ratio lies in the range 5 to 8. That is to say it is generally preferred that the ratio of the mean thickness of the bowl-shaped portion of the insert to the width of the gap between the ball and the inner perimeter of the lip has a value in the range 3 to 10, and it is particularly preferred that the ratio of the mean thickness of the bowl-shaped portion of the insert to the width of the gap between the ball and the inner perimeter of the lip has a value in the range 5 to 8.

In the use of synthetic plastics material for low friction inserts in ball and socket joints (in which a con rod is joined to a knuckle or ball which is not freely rotating), one measure of the wear which is imposed on the plastic is known as the PV factor. The PV factor is a multiple of pressure and velocity which manufacturers of inserts commonly specify should not be exceeded in order to keep wear on the inserts within acceptable limits. Where, for example, the pressure is given in pounds per square inch and the velocity is the velocity of the captive ball or knuckle relative to the plastic in feet per minute, the PV factor in known captive ball and socket joints is commonly in the range 5000 to 10000. By way of example, a PV factor in this range may arise in a knuckle joint in which the pressure of the knuckle on the socket is 3000 lbs per sq. inch and the average rocking velocity of the knuckle in the joint is 2 ft. per minute. Such an example would give a PV factor of 6000. However the present invention allows a use of synthetic plastics low friction inserts with freely rotating balls in situations which give rise to a PV factor of very many times the conventional range, for example the present invention allows a PV factor of 2 million to be withstood by a ball piston in a hydrostatic machine. The enormous increase in PV factor which arises with a freely rotating ball occurs because the ball rotates continuously and rapidly as it traverses the cam surface in a hydrostatic machine, in contrast with a ball and socket joint where the ball is captive and merely rocks within the joint. For example in a hydrostatic machine embodying the invention, for a 9 inch diameter cam track with a rotation of 300 r.p.m., the velocity will be of the order of 700 ft. per minute. With a pressure of 3000 p.s.i. and a velocity of 700 ft. per minute, the PV wear factor would be 2,100,000.

The achievement of these much higher PV factors by the present invention results from the combination of the two features described above, namely the presence of an anti-extrusion lip to prevent or inhibit extrusion of the plastics material, together with the provision of hydrostatic support by the working fluid passing through the aperture in the insert. Thus the support for the ball is partially by the synthetic plastics material, and partially by hydrostatic support by the working fluid.

A further advantage of the invention arises with the embodiments illustrated in that the edge portion 22 of the piston body 12 encompasses the ball 15 and extends from the edge of the seating 13 towards the cam surface 18 beyond the centre plane of the ball 15. In some prior art arrangements of the roller pistons, the piston body ends before reaching the centre plane of the cam follower and there is a tendency for the cam follower and piston to tilt when the cam follower meets changes in the profile of the cam surface. When the piston tilts, the edge of the piston body (which is behind the centre plane of the cam follower) has a tendency to dig into the side of the piston cylinder. It will be appreciated that if the sides of the piston body extend beyond the centre plane of the ball, as in the illustrated embodiments of the present invention, the corner of the piston body will be displaced by a greater distance from the axis of potential tilt of the piston, so that the tendency for the edge to dig into the side of the piston cylinder is reduced.

We claim:
1. A piston for a hydrostatic machine comprising:
   a freely rotating cam follower ball for following a cam surface in a hydrostatic machine by reciprocatory motion of said cam follower ball in a cylinder bore of the machine,
   a piston body for reciprocatory travel along a cylinder bore, said piston body having at one end a working face to be acted on by the working fluid of a hydrostatic machine, and at the other end a bowl-shaped seating for said ball, said piston body exposing a portion of said ball protruding from said piston body to engage a cam surface, said piston body having an aperture extending from said seating to said working face of said piston body,
   an insert of low-friction synthetic plastics material positioned between said cam follower ball and said seating in a position at the rear of said ball to accept the bearing load of said ball when engaging a cam surface, said insert having an internal bearing surface for said ball and an external surface mating with and supported by said seating, said insert having an extension which extends into said aperture in said piston body and locates said insert in said piston body, said insert having an aperture extending from said bearing surface through said extension of said insert to said working face of said piston body to allow passage of working fluid to said bearing surface for lubrication purposes and for providing hydrostatic support for said cam follower ball,
   said piston body encompassing said ball by a portion of said piston body which extends from said seating beyond the centre plane of the cam follower ball, said piston body having a lip extending around the entire perimeter of said bowl-shaped seating and projecting inwardly towards said cam follower ball for engaging said synthetic plastics insert.

* * * * *